United States Patent [19]
Fukuda

[11] Patent Number: 5,491,561
[45] Date of Patent: Feb. 13, 1996

[54] IMAGE PROCESSOR FOR PROCESSING HIGH DEFINITION IMAGE SIGNAL AND STANDARD IMAGE SIGNAL AND DISK APPARATUS THEREFOR

[75] Inventor: Hideki Fukuda, Kadoma, Japan

[73] Assignee: Matsushita Electric Industrial Co., Ltd., Osaka, Japan

[21] Appl. No.: 94,344

[22] Filed: Jul. 21, 1993

[30] Foreign Application Priority Data

Jul. 21, 1992 [JP] Japan .................................. 4-193732

[51] Int. Cl.$^6$ ............................. H04N 5/781; H04N 5/76
[52] U.S. Cl. ......................... 358/342; 358/335; 348/398; 348/397
[58] Field of Search ..................................... 358/335, 342, 358/310; 348/397, 398, 384, 390; 360/33.1; H04N 5/76, 9/79, 5/781

[56] References Cited

U.S. PATENT DOCUMENTS

| | | | |
|---|---|---|---|
| 5,010,539 | 4/1991 | Terashima et al. | 358/342 |
| 5,111,304 | 5/1992 | Kinoshita et al. | 358/342 |
| 5,136,374 | 8/1992 | Jayant et al. | 348/398 |
| 5,216,719 | 6/1993 | Oh | 348/398 |
| 5,235,420 | 8/1993 | Gharavi | 348/398 |
| 5,315,400 | 5/1994 | Kurata et al. | 358/342 |

FOREIGN PATENT DOCUMENTS

| | | |
|---|---|---|
| 2-195480 | 8/1990 | Japan. |
| 4-369989 | 12/1992 | Japan. |

*Primary Examiner*—Tommy P. Chin
*Assistant Examiner*—Khoi Truong
*Attorney, Agent, or Firm*—Willian Brinks Hofer Gilson & Lione

[57] ABSTRACT

An image signal processor for processing both high definition image signal with a high resolution and standard image signal with a resolution lower than that of the high definition image signal in which the high definition image signal is decomposed into a plurality of subband signals and the standard image signal, when input, is converted into a subband signal having a low subband. Each subband signal is encoded and recorded in a predetermined area of a disk. The subband signal recorded is read out and decoded for each subband and the low subband signal is reproduced as the standard image signal by converting the width of the low subband signal into the width of the standard image signal.

5 Claims, 9 Drawing Sheets

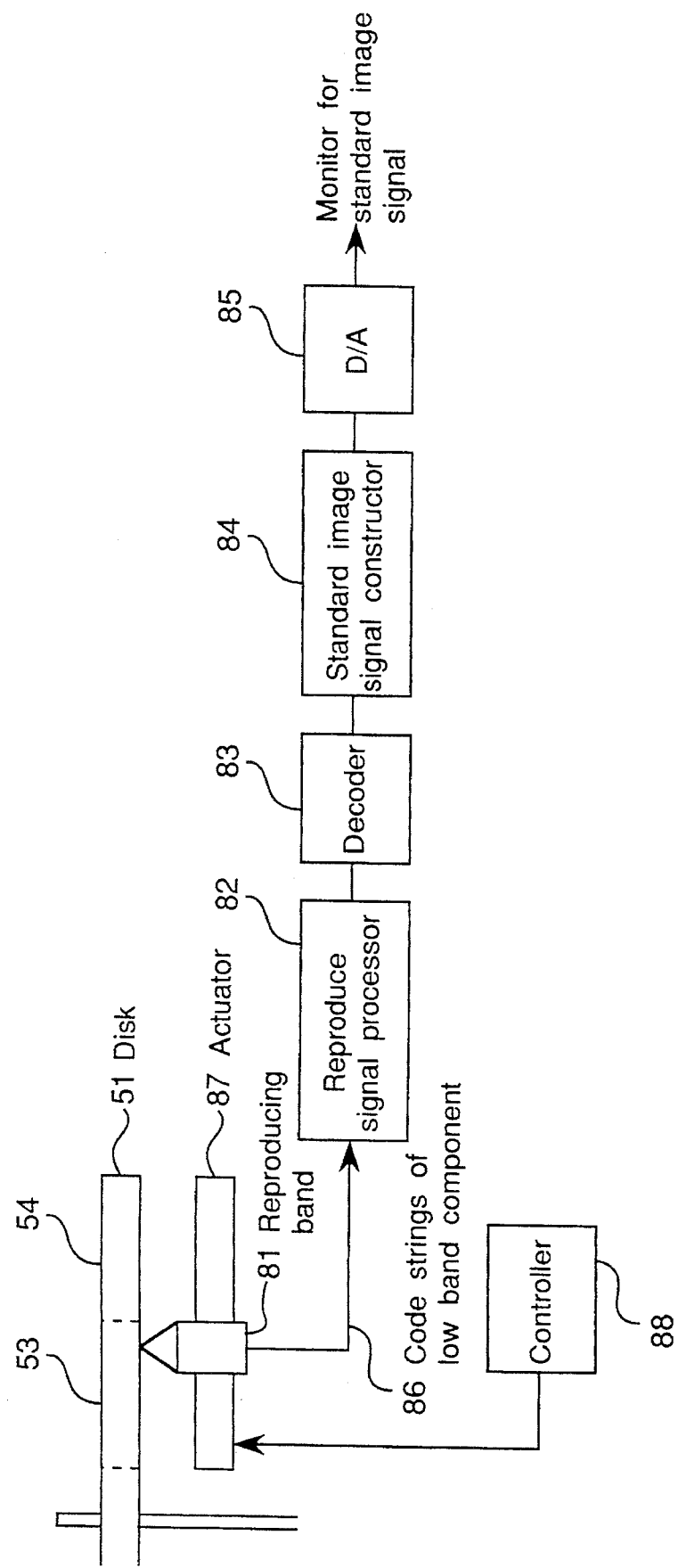

IMAGE PROCESSOR FOR PROCESSING HIGH DEFINITION IMAGE SIGNAL AND STANDARD IMAGE SIGNAL AND DISK APPARATUS THEREFOR

BACKGROUND OF THE INVENTION

1. Field of the Invention

The present invention relates to an image processor for encoding and/or decoding image signals having different frequency bands and an apparatus for recording and reproducing encoded image signals having different frequency bands.

2. Description of the Related Art

Recently, long hour recording and reproducing have been made possible by efficiently encoding an image signal to record compressed image data. Various kinds of highly efficient coding methods have been proposed. In particular, the DCT coding method that divides an image into several blocks, transforms each block by the discrete cosine transform (DOT), and quantizes and encodes the DCT coefficients is widely used.

Also, there have been proposed methods that decompose an image signal into components in several frequency bands and encode each component by a method suitable for each hand. Among these methods are the subband coding method and the wavelet-transform coding method, each recursively iterating a band decomposition that decomposes an image signal into a high band component and a low band component by filters, so that each decomposed component is encoded by a method suitable for that component through subsampling.

As recording and reproducing apparatus for image signals, VTRs and laser disk players are commercialized for consumers to record and reproduce standard image signals such as a transient image signal in the NTSC system, the PAL system and the like. However, digitizing and high image quality have been demanded by industrial areas, and products aimed at these needs are also commercialized. For example, apparatus for recording and reproducing a transient analog image signal in the NTSC system by temporally separating the luminance signal and color signals to prevent their mutual interference and apparatus for recording still and transient images in a high definition digital system are commercialized. Further, apparatus for recording and reproducing high definition images is in the process of marketing for consumers.

Also, digitizing and high image quality have been developed in transmitting and reproducing apparatus as in recording and reproducing apparatus.

However, apparatus for recording and reproducing a high definition image signal tends to be large scale and expensive compared with apparatus for recording and reproducing standard image signals, because the former has to process a high resolution image signal. Also, separate pieces of apparatus are needed in order to record and reproduce both a high definition image signal and a standard image signal. Transmitting and reproducing apparatus and disk apparatus have also the same problems.

SUMMARY OF THE INVENTION

An object of the present invention is therefor to provide an image processing system which is capable of encoding and/or decoding image signals having different resolutions.

Another object of the present invention is to provide an encoder which is capable of encoding both high definition image signal and standard image signal.

A further object of the present invention is to provide a decoder which is capable of decoding both high definition image signal and standard image signal.

One more object of the present invention is to provide an apparatus for recording and reproducing both high definition image signal and standard image signal.

In order to achieve the aforementioned objects, according to the present invention, there is provided an apparatus for encoding an image signal of a first resolution and an image of a second resolution, which is lower than said first resolution, comprising; means for decomposing an image signal of said first resolution into a plurality of subband signals by dividing the whole frequency band into a plurality of subbands, means for converting an image signal of said second resolution into a subband signal with a band equal to a predetermined one of said plurality of subbands, and means for encoding said subband signals for each of said plurality of subbands.

According to one facet of the present invention, there is provided an apparatus for reproducing an image signal from a plurality of strings of codes obtained by encoding an image signal of a first resolution for each of a plurality of subbands obtained by dividing the whole frequency band of said image signal of said first resolution comprising; means for decoding said string of codes for each of said subbands and outputting subband signals obtained thereby; means for synthesizing said subband signals into said image signal of said first resolution and outputting the same; and means for constructing an image signal of a second resolution, which is lower than said first resolution, from a predetermined one of said subband signals.

According to another facet of the present invention, there is provided an apparatus for reproducing an image signal from a plurality of strings of codes obtained by encoding an image signal of a first resolution for each of a plurality of subbands obtained by dividing the whole frequency band of said image signal of said first resolution comprising; means for extracting and outputting only a predetermined low frequency one of said plurality of strings of codes, means for decoding said predetermined string of codes, and means for constructing an image signal of a second resolution, which is lower than said second resolution, from said predetermined string of codes decoded.

According to a further facet of the present invention, there is provided a disk apparatus for recording a plurality of strings of codes obtained by encoding an image signal for each of a plurality of subbands obtained by dividing the whole frequency band of said image signal on a disk and for reproducing the image signal by reading and decoding said plurality of strings of codes recorded on the disk, comprising; means for decomposing an image signal into a plurality of subband signals by dividing the whole frequency band into a plurality of subbands, means for encoding each of said plurality of subband signals and outputting plural strings of codes, means for recording a first string of codes corresponding to a predetermined low frequency subband of said plurality of subbands on a first area of the disk and second strings of codes other than said first string of codes on a second area of the disk, means for reading said first string of codes recorded on said first area of the disk as a first component and said second strings of codes recorded on said second area of the disk as a second component, respectively, means for decoding said first and second components, respectively, and means for synthesizing said first and second components decoded and, thereby, reproducing an image signal corresponding to said image signal.

In particular, a disk apparatus of the present invention divides a disk into two concentric areas, records the first code string as the first component on one of the areas, and records the second code strings as the second components on the other area. The disk apparatus reads the code string of each component from the corresponding area of the disk to reproduce an image signal. Another disk apparatus of the present invention divides a disk into two sectors, records the first code string as the first component on one of the sectors, and records the second code strings as the second components on the other sector. The disk apparatus reads the first code string as the first component and the second code strings as the second component from the corresponding sectors of the disk to reproduce an image signal. Another disk apparatus of the present invention records the first code string as the first component on one side of a disk and records the second code strings as the second component on the other side of the disk. The disk apparatus reads each code string from the corresponding side of the disk to reproduce an image signal.

A disk apparatus of the present invention decomposes an image signal of the first resolution into plural subband signals in several frequency subbands, records a code string obtained by encoding each subband signal on one of the divided areas of the disk, and reproduces the image signal. The disk apparatus converts an image signal of the second resolution into a subband signal having a predetermined low frequency subband of the several frequency subbands and converts the predetermined low frequency subband signal of an image signal of the first resolution into an image signal of the second resolution. In this way, the disk apparatus records and reproduces image signals of both the first and second resolutions. Another disk apparatus of the present invention reads and decodes only the code string of a subband signal having the above low frequency subband recorded on the above disk, and constructs an image signal of the second resolution from the decoded component signal.

The image signal encoder described above performs encoding for recording and transmitting an image signal of a high resolution such as a high definition image signal. The image signal encoder also makes it possible to record and transmit a standard image signal such as of the NTSC system or the PAL system by processing it as a low band component of an image signal of the high resolution. Therefore, it is unnecessary to have separate pieces of recording apparatus for a standard image signal and a high resolution image signal, so that a compatibility between a standard image signal and a high resolution image signal can be realized.

An image signal reproducer described above can construct and output a standard image by processing the first code string as a first component signal having a predetermined low frequency subband which is obtained by encoding an image signal of high resolution. Therefore a compatibility between a standard image signal and a high resolution signal can be realized. Moreover, a standard image signal constructed from a code string obtained by encoding an image signal of high resolution can be received by a monitor for standard image signals, so that composed circuits can be miniaturized.

Further, a disk apparatus described above can separately manage data for a component signal in each frequency subband by recording each encoded component signal on a corresponding area of a disk. Also, a disk apparatus described above can record and reproduce image signals of both high and standard resolutions or only one of them by converting the low band component of a high resolution signal into a standard image signal and vice versa.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 9 shows a block diagram of the disk apparatus of the sixth embodiment in accordance with the present invention.

DETAILED DESCRIPTION OF THE PREFERRED EMBODIMENTS

The preferred embodiments according to the present invention will be described below with reference to the attached drawings. In the present invention, a high definition image signal and an NTSC image signal are respectively treated as a high resolution image signal and a standard image signal. The numbers of effective pixels (the number of effective horizontal pixels×the number of effective horizontal lines) in luminance signals in a high definition image signal and an NTSC image signal are respectively 1920× 1024 and 720×486. Therefore, both the horizontal and vertical resolutions of the high definition image signal are respectively a little over two times of the corresponding resolutions of the standard image signal. The cases to which the wavelet-transform coding method is applied as a coding method of frequency band decomposition are described in the present embodiments. Also, an encoded signal is recorded in a recording medium, and reproducing apparatus reads the encoded signal recorded on a recording medium for reproduction.

First, the image signal encoder and the image signal reproducer of the first embodiment in accordance with the present invention are described with reference to FIG. 1.

Figure 1:
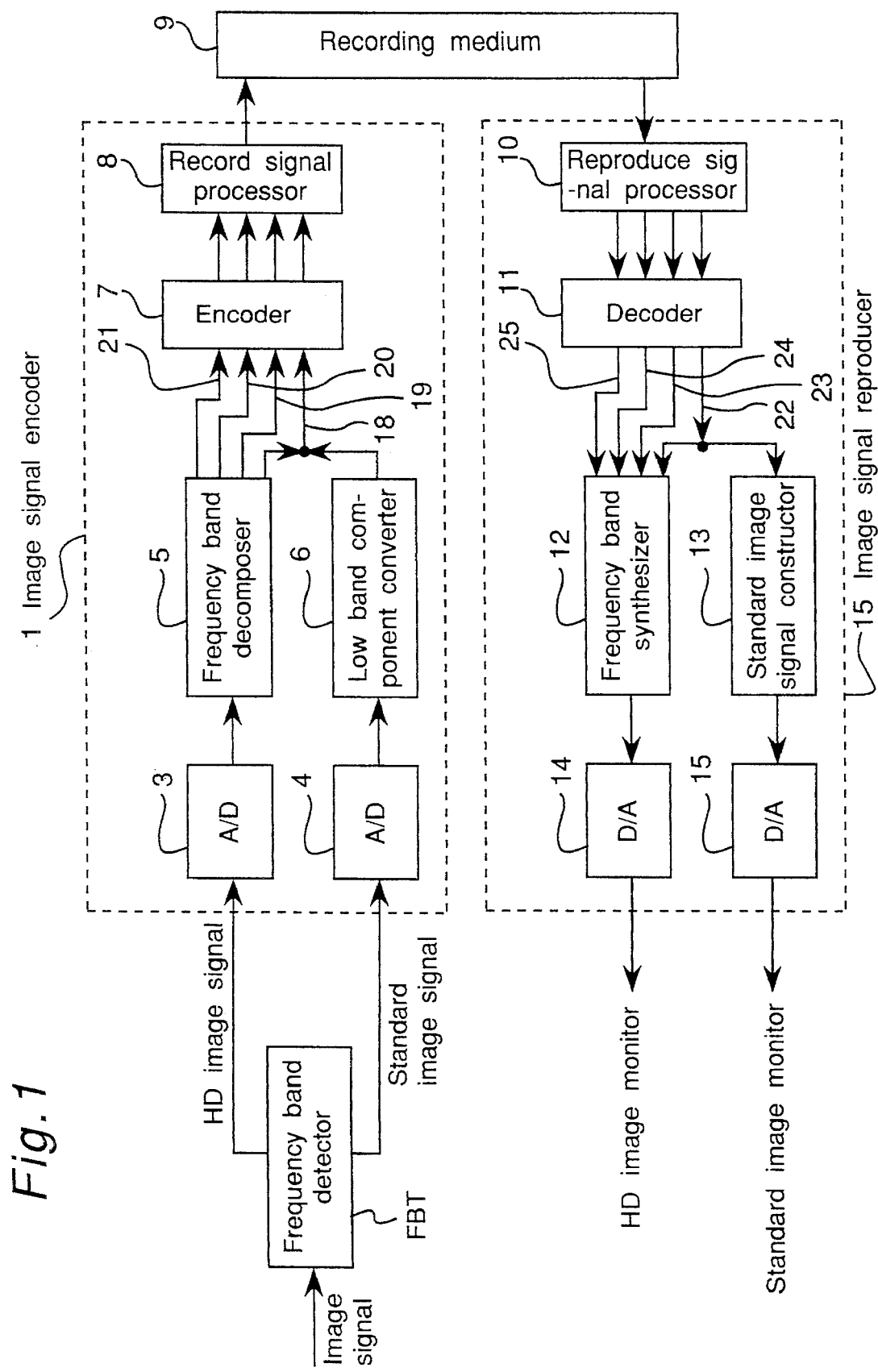
FIG. 1 shows a block diagram of the image signal encoder and image signal reproducer of the first embodiment in accordance with the present invention.

As shown in FIG. 1, an image signal processor is comprised of an image signal encoder 1 and an image signal decoder 2.

The image signal encoder 1 is composed of a first analog-to-digital converter 3 to which a high definition image is input, a second analog-to-digital converter 4 to which a standard image signal is input, a frequency band decomposer 5 for decomposing the high definition image signal into a plurality of subband signals by dividing the whole frequency band of the high definition image signal into a plurality of subbands, a converter 6 for converting the standard signal into a subband signal having the lowest one of the plurality of subbands divided, an encoder 7 for encoding each subband signal, and a record signal processor 8 for processing encoded subband signals to record them on a recording medium 9.

An image signal to be input to the image signal encoder 1 is input to a frequency band detector FBT for detecting a frequency band of the image signal. If the image signal has a wide frequency band corresponding to a high definition image signal, it is input to the first analog-to-digital converter 3 and, if not, it is input to the second analog-to-digital converter 4.

Figure 2:
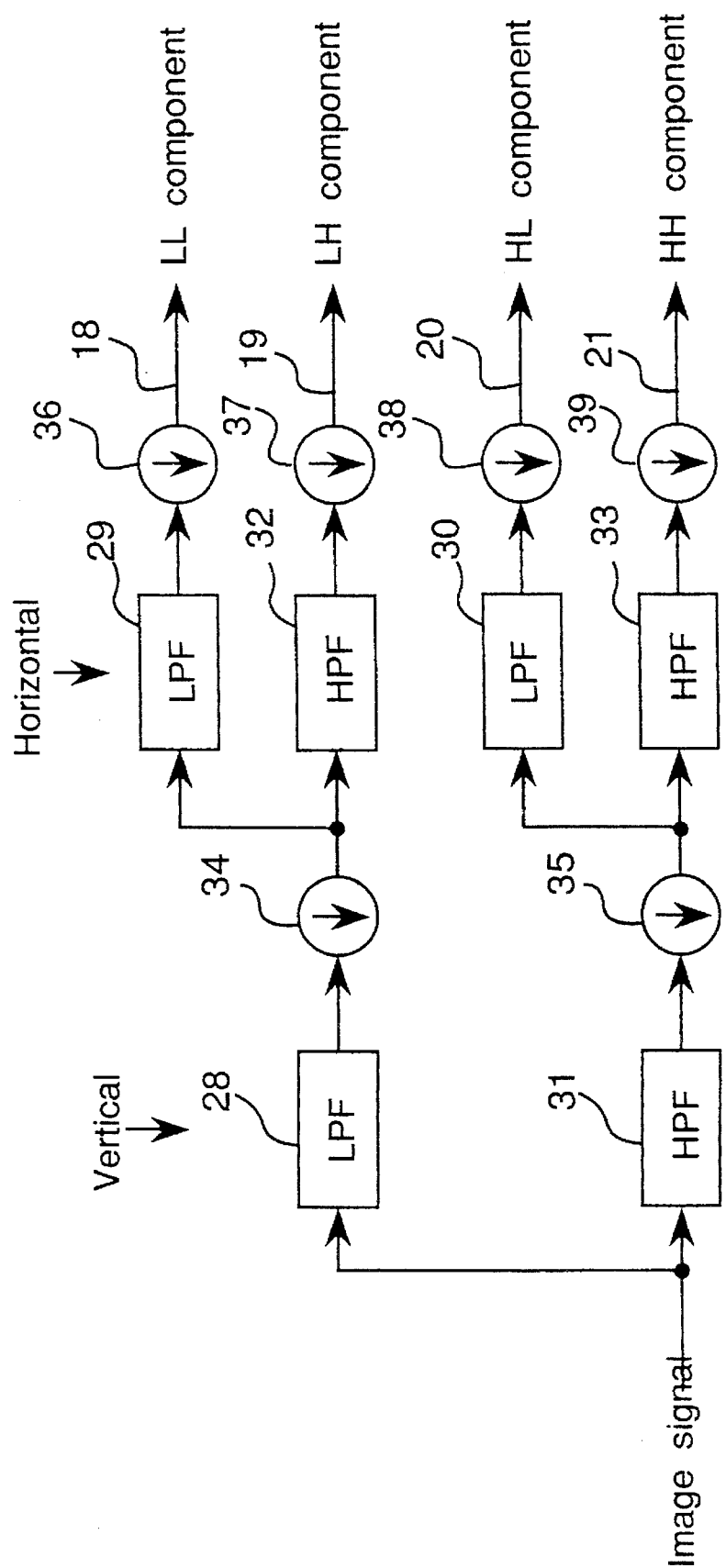
FIG. 2 shows a block diagram of the frequency band decomposer shown in FIG. 1.

When a high definition image signal is to be recorded, an input signal is digitized by the first analog-to-digital converter 3 and decomposed into components in several frequency bands by frequency band decomposer 5. If the wavelet-transform coding method is used, frequency band decomposer 5 performs frequency band decomposition using quadrature mirror filters (QMF) in two dimensions, horizontally and vertically. A block diagram of frequency band decomposer 5 using QMFs is shown in FIG. 2. First, an input signal is decomposed vertically by a low-pass filter (LPF) 28 and a high-pass filter (HPF) 31. Next, sampling devices 34 and 35 subsample the decomposed signals by the ratio 2:1. Further, the subsampled vertical low band component and high band component are horizontally decomposed by LPF 29 and HPF 32 and by LPF 30 and HPF 33 respectively. Sampling devices 36, 37, 38, and 39 subsample the decomposed signals by the ratio 2:1. As a result, the original input signal is decomposed into the four components: an LL component 18, which is vertically in a low subband and horizontally in a low subband, an LH component 19, which is vertically in a low subband and horizontally in a high subband, an HL component 20, which is vertically in a high subband and horizontally in a low subband, and an HH component 21, which is vertically in a high subband and horizontally in a high subband. Then each decomposed component is encoded by encoder 7 and processed by record signal processor 8 to be recorded on a recording medium 9.

Figure 3:
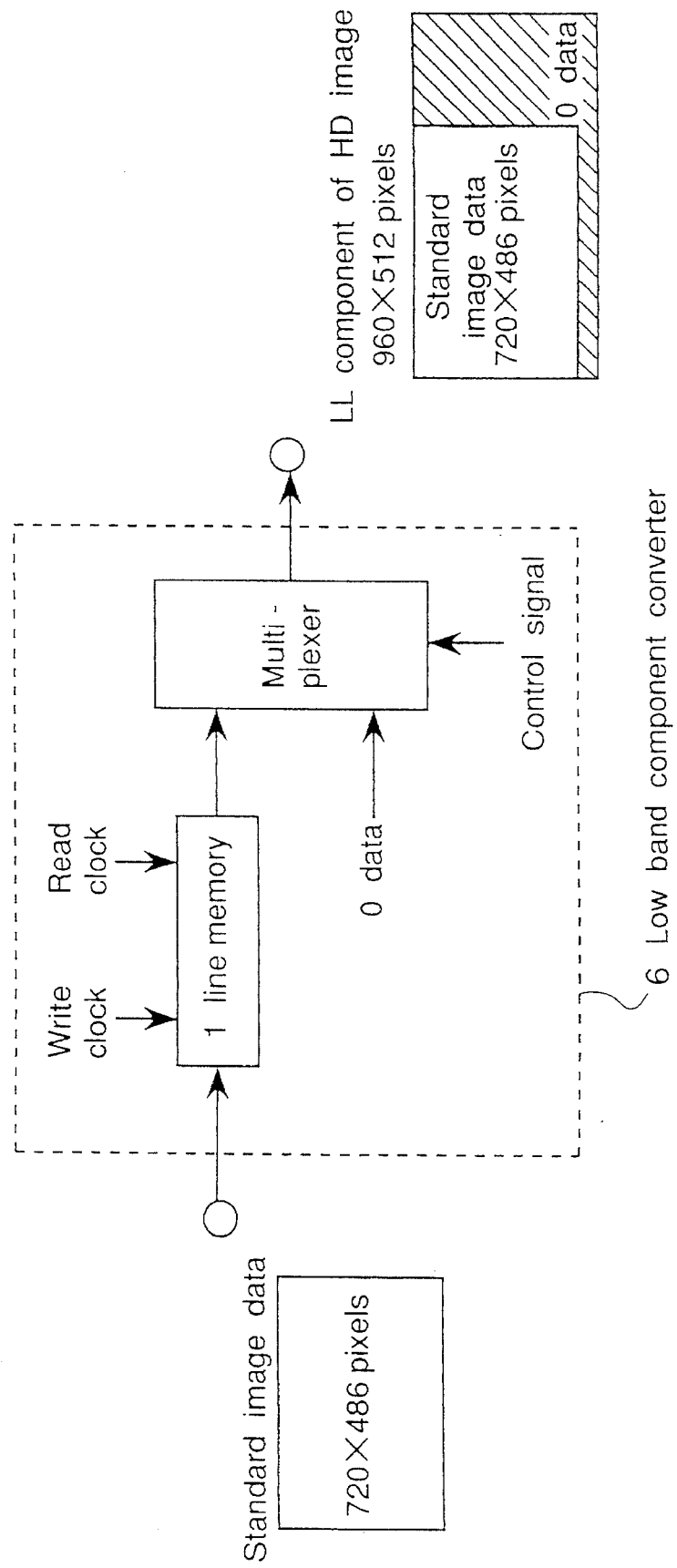
FIG. 3 shows a block diagram of the convertor for the standard image signal shown in FIG. 1.

On the other hand, when a standard image signal is to be recorded, an input signal is digitized by the second analog-to-digital converter 4 and input to the low band component converter 6. FIG. 3 shows a block diagram of the low band component converter 6 which is comprised of a one line memory 6A and a multiplexer 6B. Standard image data of 720×486 pixels are written into the one line memory 6A in synchronization with WRITE clocks. Then, the standard image data read out from the one line memory 6A in synchronization with READ clocks and zero data are input to the multiplexer 6B. The multiplexer 6B switches input signals to composite an LL component 18 of 960×512 pixels of a high definition image signal of 1920×1024 pixels. Low band component converter 6 converts the input signal into a subband signal such that the number of pixels of the converted signal is the same as that of LL component 18, so that the standard image signal can be treated as a low band component (LL component 18) of a high resolution image signal. Since a high resolution image signal is decomposed into four band components, the vertical and horizontal resolutions of LL component 18, which is vertically in a low band and horizontally in a low band, are respectively half of the corresponding resolutions of a high resolution image signal. Therefore, if the high resolution image signal is the high definition image signal such that its effective pixels are 1920×1024, and if the standard image signal is the NTSC image signal, whose effective pixels are 720×486, then the number of effective signals of the standard image signal is about 30% less than the number of effective pixels of the high resolution signal. In such a case, the conversion by low band component converter 6 is easily made by setting the pixel levels at zero for the pixels that are beyond the area covered by the standard image signal. Then the converted signal is encoded as LL component 18 by encoder 7 and input to recorded signal processor 8 to be recorded on recording medium 9.

When a standard image signal is recorded, the components in unused frequency bands (LH component 21, HL component 22, and HH component 23) can be set zeroes to be recorded on recording medium 9. If a recording medium for standard image signals is used in this case, only the low band component is recorded. In these ways, compatibility between a standard image signal and a high resolution image signal can be obtained.

Next, image signal reproducer 2 of FIG. 1 is described in the following. Image signal reproducer 2 is an apparatus that reads an encoded signal recorded on recording medium 9 and reproduces an image signal. Image signal reproducer 2 comprises a reproduced signal processor 10, a decoder 11, a frequency band synthesizer 12, a digital-to-analog converter 14 for a high resolution signal, a standard image signal constructor 13, and a digital-to-analog converter 15 for a standard image signal, so that image signal producer 11 can reproduce both a high resolution image signal and a standard image signal.

First, component signals recorded on recording medium 9 are read and processed for error correction by reproduced signal processor 10. Then the output signals of reproduced signal processor 10 are decoded by decoder 31, and the decoded components (LL component 22, LH component 23, HL component 24, HH component 25) are combined by frequency band synthesizer 12. Then a reproduced high resolution image signal is obtained by converting the output signal of frequency band synthesizer 12 into an analog signal by digital-to-analog converter 14.

On the other hand, in order to reproduce a standard image signal, only LL component 22 of the four band components is extracted and decoded by decoder 31, and converted into a signal having the same number of pixels of a standard image signal by standard image signal constructor 13. Then the output signal of standard image signal constructor 13 is converted into an analog signal by digital-to-analog converter 15 as a reproduced standard image signal 27.

Since the number of pixels of a standard image signal is about 30% fewer than the number of pixels of LL component 18 as described above, LL component 18 is converted into a standard image signal by truncating an appropriate area of LL component 18.

By organizing the image signal reproducer in this way, both a high resolution image signal and a standard image signal can be reproduced by the reproducer. If the recording medium has recorded an encoded signal of a standard image signal, then a signal input to the image signal reproducer consists of only the LL component, and the other high band components are treated as having zeroes. By this means, even if a standard image signal is recorded on the recording medium, both a monitor for high definition image signals and a monitor for standard image signals can display a reproduced image.

In the first embodiment, frequency band decomposition is performed vertically once and horizontally once. However, the low band component can be recursively decomposed several times. As an example, the image signal encoder of the second embodiment is shown in FIG. 4.

Figure 4:
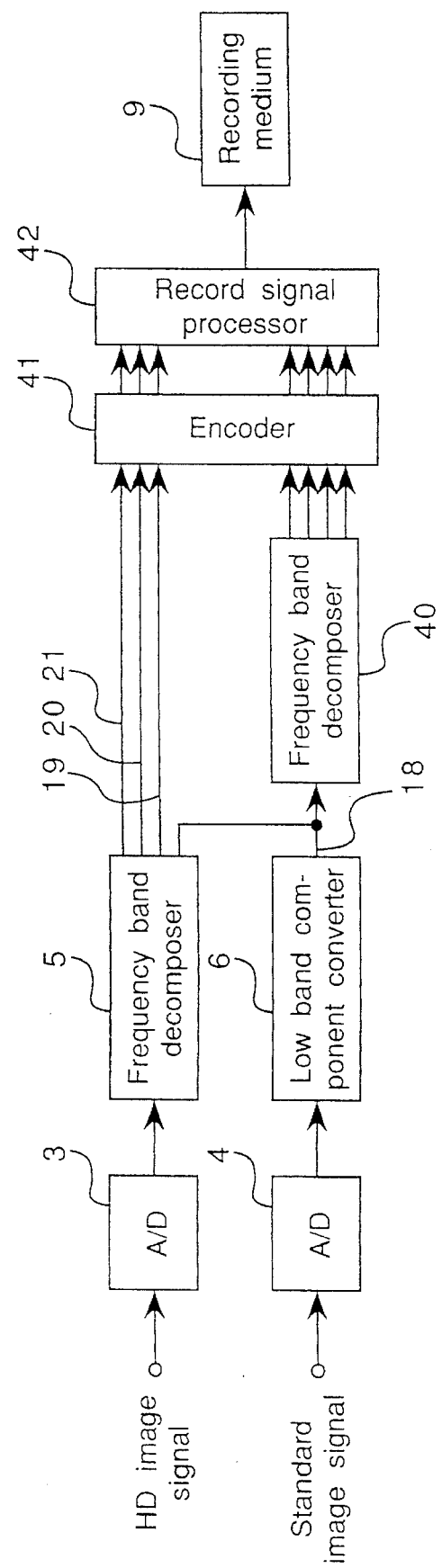
FIG. 4 shows a block diagram of the image signal encoder of the second embodiment in accordance with the present invention.

In FIG. 4, a frequency band decomposer 40 is added to image signal encoder 1 of FIG. 1, so that LL component 18 is further decomposed. When a standard image signal is encoded by the second embodiment, an input signal is converted by analog-to-digital converter 4 and low band component converter 6 as in the first embodiment, so that the converted signal can be processed as LL component 18. Then, the output of low band component converter 6 is decomposed by frequency band decomposer 40, and each decomposed component is encoded by an encoder 41. The encoded component is processed by a record signal processor 42 to be recorded on recording medium 9.

Frequency band decomposers 5 and 40 are organized as the first embodiment shown in FIG. 2. The reproducing apparatus used with the present encoder is also organized as in the first embodiment with modifications for processing an increased number of band components.

Next, the image signal reproducer of the third embodiment is described with reference to FIG. 5.

Figure 5:
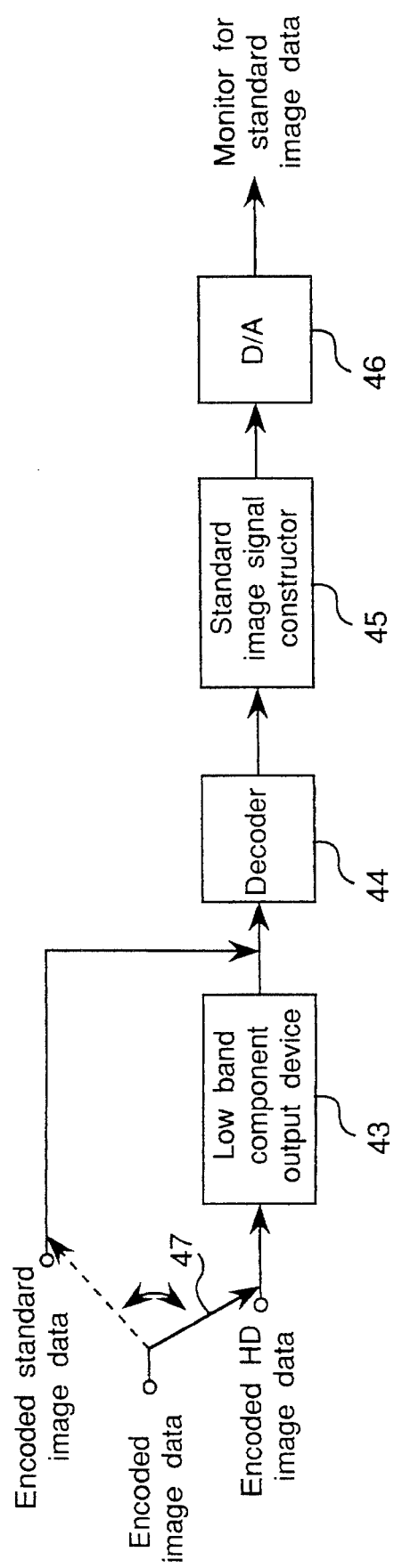
FIG. 5 shows a block diagram of the image signal reproducer of the third embodiment in accordance with the present invention.

FIG. 5 shows the image signal reproducer comprising an input ignal selector 47, a low band component output device 43, a decoder 44, a standard image signal constructor 45, and a digital-to-analog converter 46 for a standard image signal. If an input signal is a code sequence obtained by encoding a decomposed high resolution signal component by component, then input signal selector 47 applies the input signal to low band component output device 43. If an input signal is a code sequence obtained by encoding a standard image signal, then input signal selector 47 applies the input signal to decoder 44.

Low band component output device 43 extracts a component signal in a predetermined frequency band from component signals in the several frequency bands into which a high resolution image signal is decomposed. If band decomposition is performed once for each dimension, horizontally and vertically, then the component signal in the predetermined frequency band is the LL component. The code sequence output from low band component output device 43 is decoded by decoder 44 and converted into a signal having the same number of pixels as a standard image signal by standard image signal constructor 45. The converted signal is further converted into an analog signal by digital-to-analog converter 46 to be displayed by a monitor for standard image signals.

If an input signal is a code sequence obtained by encoding a standard image signal, then the input signal is directly applied to decoder 44, and the decoded signal passes through standard image signal constructor 45 without undergoing any processing. In this way, an input signal of a code sequence obtained either by encoding a high resolution image signal or a standard image signal can be received by a monitor for standard image signals.

The image signal reproducer of the third embodiment can not reproduce a high resolution image. However, consisting of only a means for reproducing a standard image signal, the reproducer can scale down the circuits of the apparatus of the first and second embodiments, which can reproduce both a high resolution image and a standard image. The reproducer can also make smaller its circuit scale than an apparatus reproducing only a high resolution image signal. Further, the reproducer can view a content of an encoded high resolution image signal without a monitor for high resolution images. Therefore, the image signal reproducers of the first and second embodiments are regarded as quality apparatus, while the image signal reproducer of the third embodiment is regarded as a popular apparatus. Both types of apparatus can use the same recording medium and can process both a medium on which a high resolution image signal is recorded and a medium on which a standard image signal is recorded.

Next, the disk apparatus of the fourth embodiment in accordance with the present invention is described with reference to FIGS. 6a and 7.

Figure 6A:
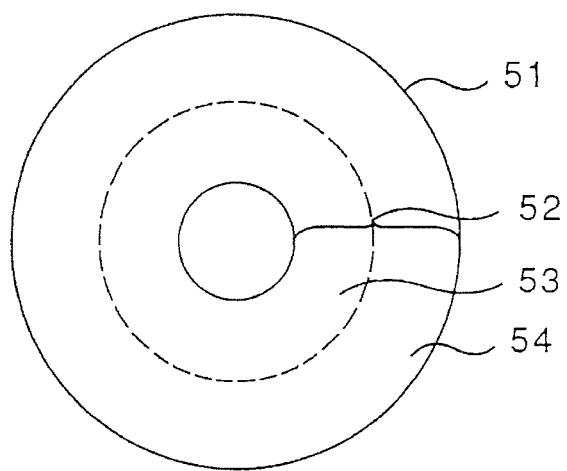
FIGS. 6a, 6b and 6c show exemplary disks used for the disk apparatus in accordance with the present invention.
Figure 7:
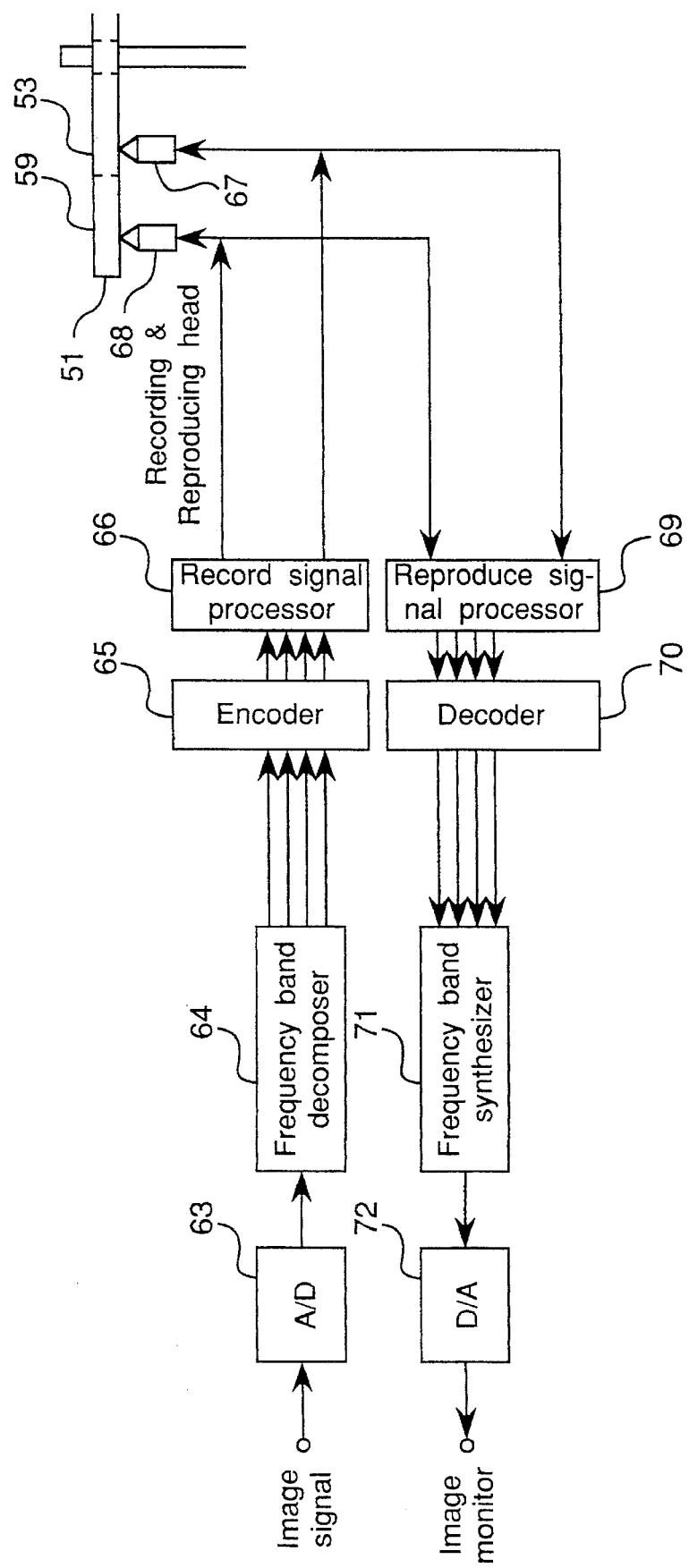
FIG. 7 shows a block diagram of the disk apparatus of the fourth embodiment in accordance with the present invention.

FIG. 6a shows a disk 51 used for the fourth embodiment. The recording part 52 of disk 51 is divided into a concentric inner part 53 and an outer part 54, so that inner part 53 records a code sequence obtained by encoding the low band component, and outer part 54 records a code sequence obtained by encoding the high band components. FIG. 7 shows a disk apparatus recording on and reproducing from the disk. The disk apparatus comprises an analog-to-digital converter 63, a frequency band decomposer 64, an encoder 65, a recorded signal processor 66, a first read/write head 67, a second read/write head 68, a reproduced signal processor 69, a decoder 70, a frequency band synthesizer 71, and a digital-to-analog converter 72. An image signal is digitized by analog-to-digital converter 63 and decomposed into components in several frequency bands by frequency band decomposer 64. Frequency band decomposer 64 is the same as frequency band decomposer 5 described in the first embodiment and decomposes an input signal into components in four frequency bands in two dimensions, vertically and horizontally.

The decomposed component in each frequency band is encoded by encoder 65 and processed by recorded signal processor 66 to be recorded on disk 51. The code sequence of the component in the vertically and horizontally low frequency band (LL component) is recorded on inner part 53 of disk 51 by first read/write head 67, and the code sequence of components in the other high frequency bands is recorded on outer part 54 by second read/write head 68.

In order to reproduce an image signal, the code sequences of components in the low frequency band and the high frequency bands are respectively read by read/write heads 67 and 68, processed by reproduced signal processor 69, and decoded by decoder 70. The frequency band synthesizer 71 combines the decoded components to obtain a digital image signal, which is then converted into an analog signal by digital-to-analog converter 72 to be output to a monitor. In this way, data management is performed for each decomposed component in several frequency bands.

Figure 8:
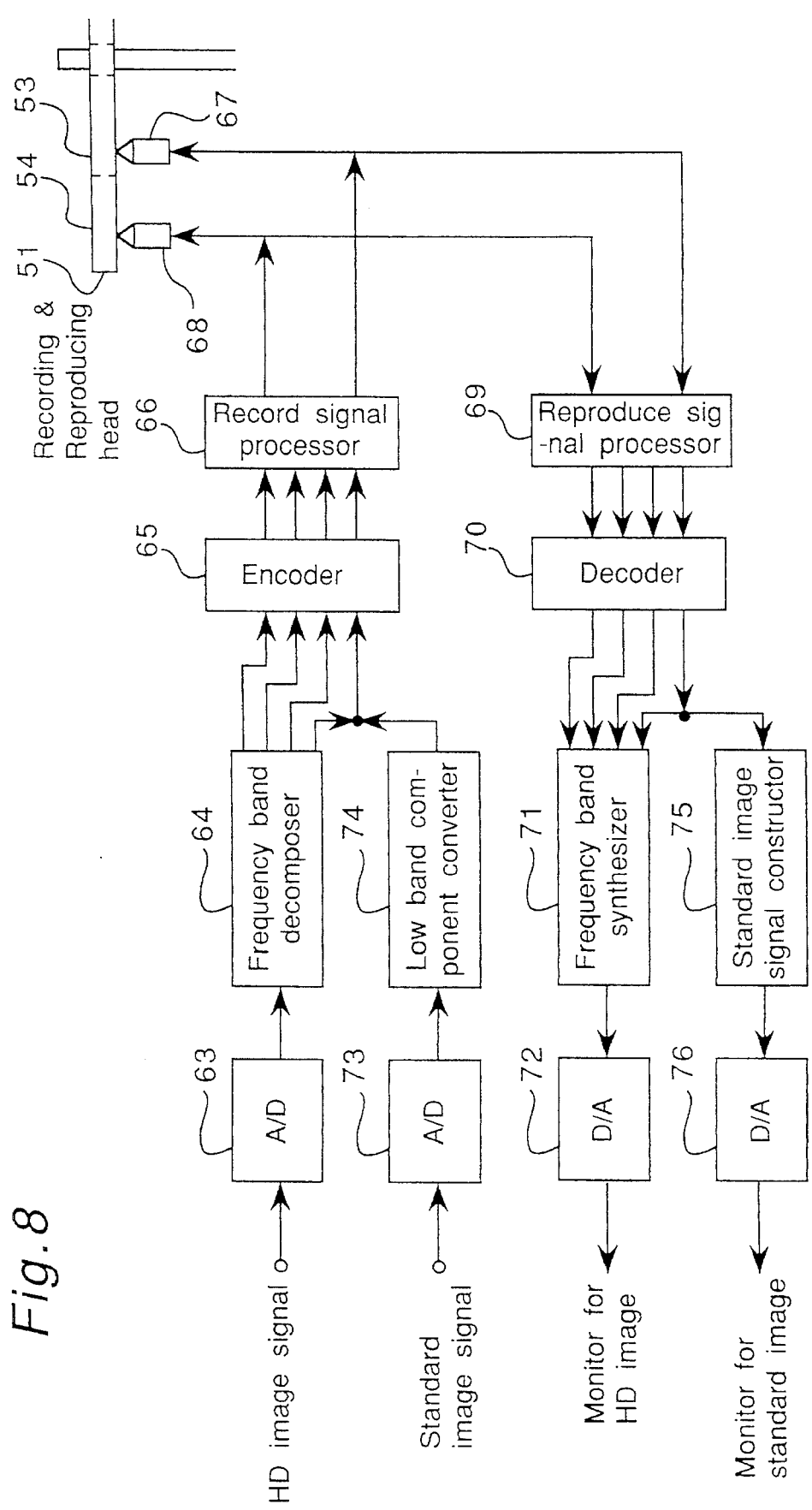
FIG. 8 shows a block diagram of the disk apparatus of the fifth embodiment in accordance with the present invention.

Next, as the fifth embodiment, an example of application of the image signal encoder and image signal reproducer of the first embodiment to a disk apparatus of the present invention is described. A block diagram of the disk apparatus of the fifth embodiment is shown in FIG. 8, in which a digital-to-analog converter 73 for a standard image signal, a low band component converter 74, a standard image signal constructor 75, and an analog-to-digital converter 76 for a standard image signal are added to the disk apparatus of the fourth embodiment shown in FIG. 7. The method of recording and reproducing a standard image signal is the same as in the first embodiment. That is, low band component converter 74 converts a standard image signal so that a standard image signal is treated as the component (LL component) of a high resolution image signal in a predetermined low frequency band. Standard image signal constructor 75 constructs a standard image signal from the component (LL component) in the predetermined low frequency band. When a high resolution image signal is recorded and reproduced, both inner part 53 and outer part 54 of disk 51 are used, and when a standard image signal is recorded and reproduced, only inner part 53 may be used. Therefore, a disk on which only a standard image signal is recorded can be made smaller than a disk on which a high resolution image signal is recorded. The disk apparatus of the present embodiment can use both types of disks for recording and reproduction.

In the fourth and fifth embodiments, as described above, the low band component is recorded on the inner part of a disk, and the high band components is recorded on the outer part. Conversely, the low band component may be recorded on the outer part, and the high band components may be recorded on the inner part. If the rotational speed of the disk is constant, the linear velocity of the outer part is higher than that of the inner part. Therefore, if the amount of information of the low band component is greater than that of the high band components, then the transmission rate on the outer part can be greater than that of the inner part, so that a greater amount of information can be recorded on and read from the outer part. Further, by the same reason, the recording density can be reduced on the outer part, so that the probability of error occurrences on the outer part caused by noise and the like can be reduced on the outer part. Since an error in the low band component of an image signal gives greater degradation of image quality than an error in the high band components, recording the low band component on the outer part is favorable for image quality.

Next, as the sixth embodiment, an example of application of the image signal reproducer of the third embodiment to a disk apparatus of the present invention is described.

A block diagram of the disk apparatus of the sixth embodiment is shown in FIG. 9. The disk apparatus comprises a reading head 81 moved by an actuator 87 in accordance with control signals output from a controller 88, a reproduced signal processor 82, a decoder 83, a standard image signal constructor 84, and a digital-to-analog converter 85. On a disk 51, the low band component of a high resolution image signal is recorded on an inner part 53, and the high band components of the high resolution image signal is recorded on an outer part 54. A code sequence 86 of the low band component (LL component) recorded on inner part 53 is read by read head 81, processed by reproduced signal processor 82 for error correction and the like, and decoded by decoder 83. Standard image signal constructor 84 constructs a standard image signal from the decoded low band component of a high resolution image signal. The constructed standard image signal is converted into an analog signal by digital-to-analog converter 85 to be displayed by a monitor for standard image signals.

The disk apparatus of the present embodiment reproduces only a standard image signal from a disk on which a high resolution image signal is recorded. However, the composition of the apparatus is scaled down. For example, only a read head for the low band component is required. Therefore, a low priced disk apparatus can be provided.

Figure 6B:
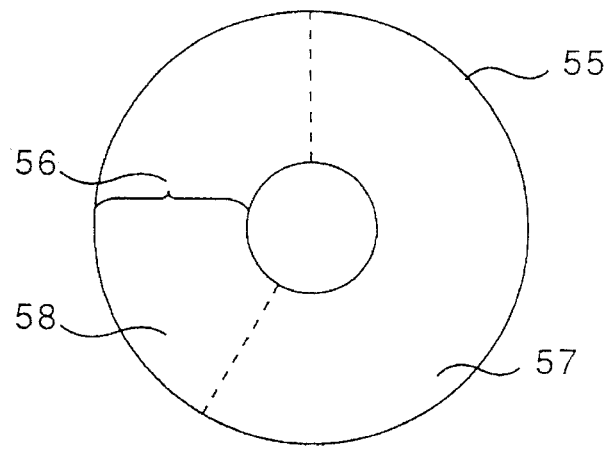

Recording/reproducing part 56 of a disk in accordance with the present invention can be divided into two sectors 57 and 58, as shown in FIG. 6b. In this case, the low band component and the high band components may be recorded respectively on sectors 57 and 58, or, conversely, on sectors 58 and 57. This case requires a means of constructing a signal to be recorded from the code sequences of components in several frequency bands and a means of decomposing a signal to be reproduced into the code sequences of components in several frequency bands. However, recording and reproducing can be performed with one read/write head. The code sequences of the several band components may be combined by a method of time division multiplexing.

Figure 6C:
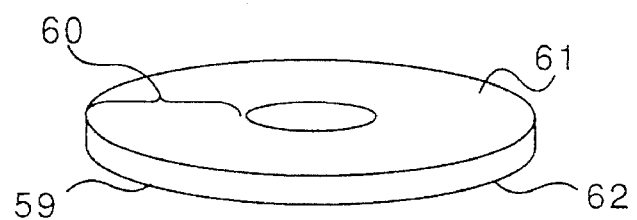

A disk 59 shown in FIG. 6c records a signal on a recording part 60 of the two sides. The low band component is recorded on and reproduced from either one of the two sides, and the high band components are recorded on the other side. If the image signal encoder and image signal reproducer of the first embodiment are applied to a disk apparatus using this disk, then both sides of the disk are used, when a high resolution signal is recorded and reproduced; and one side of the disk is used, when a standard image signal is recorded and reproduced. Therefore, a disk for a standard image signal can be lower priced than a disk for a high resolution image signal.

A disk in accordance with the present invention may be divided more than two areas.

A standard image signal may be converted into the component in any predetermined frequency band, other than the LL component, of a high resolution image signal.

A standard image signal may be converted into the LL component by interpolation processing in place of adding zeroes as described above. The LL component of a high resolution image signal may be converted into a standard image signal by thinning out pixels in place of truncating an image area as described above.

A high resolution image signal and a standard image signal in the present embodiments are not limited to the 1920×1024 high definition image signal and the 720×486 NTSC image signal respectively. For example, the PAL image signal can be treated as the standard image signal in the present embodiments.

The recording medium in accordance with the present invention may be an optical disk, a magnetic disk, or magnetic tape. Therefore, an image signal is recorded on and read from a recording medium optically or magnetically depending on the medium.

When an encoded signal is transmitted, the compositions and the operations of the present first and second embodiments are the same as described above except that recording medium 9 of FIG. 1 and FIG. 4 is replaced by a transmission channel.

The frequency band decomposition is performed by the wavelet-transform coding method as shown in FIG. 2 in the present embodiments. However, the method may be replaced by the subband coding method or others such that an image signal is decomposed into components in several frequency bands.

A component signal in each frequency band may be encoded by the discrete-cosine-transform coding method such that the component signal is divided into blocks and each block may be transformed by the discrete cosine transform. The coding method may be the DPCM coding method that encodes error signals predicted by predictors.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A disk apparatus for recording a plurality of strings of codes obtained by selectively encoding image signals of different resolutions and for selectively reproducing image signals of different resolutions by reading and decoding said plurality of strings of codes recorded on the disk, said apparatus comprising;

means for selectively inputting an image signal of a first resolution and an image signal of a second resolution, which is lower than said first resolution, means for decomposing an image signal of said first resolution into a plurality of subband signals by dividing the whole frequency band into a plurality of subbands including a low subband component, means for converting an image of said second resolution into a low subband signal such that said converted image signal of said second resolution has a band equal to said low subband component of said image signal of said first resolution, means for selectively encoding in parallel each of said plurality of subband signals, including said lowband signal, for an image signal of first resolution and an image signal of second resolution, and outputting plural strings of codes, said encoding means comprising a single encoder, means for selectively recording a first string of codes corresponding to a predetermined low frequency subband of said plurality of subbands for said image signal of first resolution and a second string of codes corresponding to said lowband signal for said image signal of second resolution on a first area of the disk and third strings of codes other than said first or second strings of codes on a second area of the disk, said means for recording comprising a first head for recording said first and second strings of codes on said first area, and a second head for recording said third strings of codes on said second area, means for selectively reading said first and second strings of codes recorded on said first area of the disk as a first component and said third strings of codes recorded on said second area of the disk as a second component, respectively, said means for reading comprising said first head operative for reading said first and second strings of codes, and said second head operative for reading said third strings of codes, means for selectively activating both first and second heads for reproducing an image signal of first resolution and activating only first head for reproducing an image signal of said second resolution, means for selectively decoding said first and second components, respectively, and means for selectively synthesizing said first and second components decoded and, thereby, reproducing image signals corresponding to said image signal of said first resolution and said image signals of said second resolution.

2. The disk apparatus as claimed in claim 1 in which said first second areas are separated in a radial direction of the disk.

3. The disk apparatus as claimed in claim 1 in which said first and second areas are separated in a circumferential direction of the disk and first and second reading heads are provided for reading information recorded on said first and second areas, respectively.

4. The disk apparatus as claimed in claim 1 in which the disk has two recording planes and said first and second areas are allocated to said two recording planes one to one.

5. The disk apparatus as claimed in either one of claims 1, 2, 3 and 4 in which a first image signal of a high resolution and a second image signal of a low resolution are selectively input to the disk apparatus and, when said first image signal is input, said first image signal is decomposed into a plurality of subband signals, and there is provided means for converting said second image signal, when input, into a subband signal having a frequency band equal to said predetermined low frequency subband, said subband signal being recorded on said first area of the disk after encoding it.

* * * * *